W. F. GILES.
PROCESS FOR PRODUCING, FROM STRAW, A LIQUID SUITABLE FOR THE PRODUCTION OF ALCOHOL.
APPLICATION FILED JAN. 20, 1908.
918,997.
Patented Apr. 20, 1909.
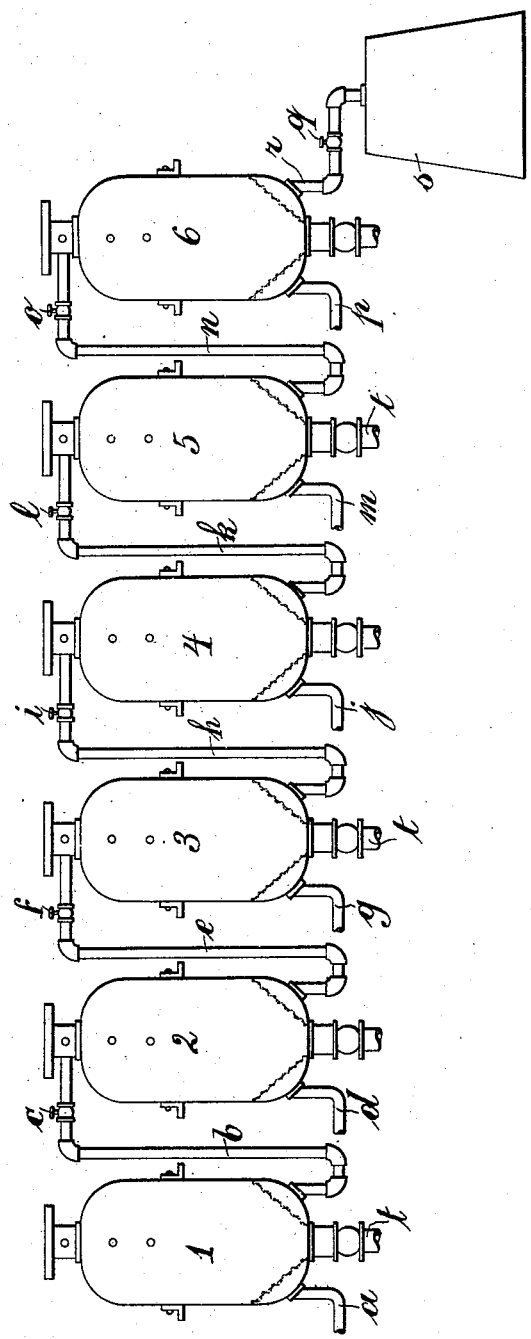

UNITED STATES PATENT OFFICE.

WILLIAM F. GILES, OF NEW YORK, N. Y., ASSIGNOR OF ONE-HALF TO FREDERICK C. NORRIS, OF DETROIT, MICHIGAN.

PROCESS FOR PRODUCING, FROM STRAW, A LIQUID SUITABLE FOR THE PRODUCTION OF ALCOHOL.

No. 918,997.　　　Specification of Letters Patent.　　　Patented April 20, 1909.

Application filed January 20, 1908. Serial No. 411,617.

*To all whom it may concern:*

Be it known that I, WILLIAM F. GILES, a citizen of the United States of America, and a resident of New York, in the county and State of New York, have invented certain new and useful Improvements in Processes for Producing, from Straw, a Liquid Suitable for the Production of Alcohol, of which the following is a specification.

This invention has reference to improvements in a process of producing alcohol from straw. It is the special object of my invention to utilize the fermentable matter and substances in straw for the production of ethyl alcohol. In order to extract all the substances which may be transformed into saccharine matter I make use of a novel process of methodically and progressively extracting these substances from the straw whereby the concentration of the leached out liquid is simultaneously effected and may at once be further treated for the production of alcohol without any special concentration. My process of producing alcohol from straw may be advantageously used in various trades where straw is a raw material before the same is worked up producing thus the alcohol as a profitable by-product. It is of course understood that straw may be used solely for this purpose in places where same is so abundant that it is burned up in the fields to utilize its ashes as a fertilizer.

My novel process may be carried out in any suitable apparatus but in order to make the process entirely clear one form of apparatus is diagrammatically illustrated in the accompanying drawing.

In carrying out my process of producing alcohol from straw I substantially proceed as follows: The straw is placed in the apparatus which consists of a multiple of digesters of which six are shown on the diagrammatical sketch. The straw is preferably cut into small pieces of about 1½ inch lengths. Now water is pumped into digester marked 1 on the drawing and steam introduced through the steam pipe $a$. The straw is then boiled for one hour at a pressure of about 60 lbs. The single digesters of the battery are successively connected by pipes and valves which are provided between each pair of neighboring digesters. The pipe $b$ leading from digester 1 to digester 2 has a valve $c$ which remains closed during the time of boiling the straw in the first digester. After the straw has been boiled for an hour in the first digester the valve $c$ is opened and the liquid blown by steam pressure into the digester 2. A fresh supply of water is pumped into digester 1 and steam introduced into digester 2 through the steam pipe $d$ and the straw in both digesters is boiled for the period of one hour. After this the stronger liquid of digester 2 is blown through the pipe $e$ into the digester 3 after opening the valve $f$ and the liquid in digester 1 is blown into the digester 2. The straw in digesters 2 and 3 is now boiled for an hour steam being introduced into the digester 3 through the steam pipe $g$. Now the liquid in digester 3 is blown into the digester 4 through the pipe $h$ after opening the valve $i$ and the liquid in digester 2 blown into digester 3. The straw in digesters 3 and 4 is now boiled for an hour steam being introduced through the steam pipe $j$ into digester 4. Then the liquid in digester 4 is blown into digester 5 through the pipe $k$ after the valve $l$ was opened for this purpose. At the same time the liquid in digester 3 is blown into digester 4 and both are boiled for one hour steam being introduced through the steam inlet $m$ into the digester 5. After one hour of boiling the liquid in digester 5 is blown into the digester 6 through the pipe $n$ after the valve $o$ was opened for this purpose and the liquid in digester 4 is blown into digester 5. Then both are boiled for one hour steam being introduced through the steam pipe $p$ into the digester 6. When both have been boiled for one hour the valve $q$ of the pipe $r$ is opened and the liquid in digester 6 is blown into the discharge tank $s$. Finally the liquid in the digester 5 is blown into the digester 6 and boiled for one hour when it is also discharged into the tank $s$.

In the described manner the straw in each digester is leached out twice but the same liquid is blown from one digester into the other and therefore the resulting liquid after leaving digester 6 is rather strong as if it had been concentrated. This neutral liquid is usually of about 10°, Twaddell's scale.

When all the liquid has been blown into the discharge tank it is acidulated, preferably with sulfuric acid, and allowed to rest for about 24 hours. During this time the extracted substances are converted into fermentable saccharine matter. Now a suitable ferment is added and after the fermentation is finished the alcohol is distilled off. By this process one ton of straw usually yields about 30 gallons of ethyl alcohol of 95% or 190 proof.

The straw in the digester is removed through the large pipes $t$ and may further be used in the arts and trades. The alcohol manufactured from straw thus is in many instances a profitable by-product.

In the described manner I have provided a novel process of producing alcohol from straw which is simple and inexpensive.

Having thus described my invention I claim as new and desire to secure by Letters Patent:

1. The process of producing a liquid suitable for the production of alcohol consisting in leaching out successively separate quantities of straw under pressure with the same quantity of boiling water, removing the concentrated liquid thus obtained, and acidulating the same whereby the extracted substances are transformed into fermentable matter.

2. The process of producing a liquid suitable for the production of alcohol consisting in leaching out successively separate quantities of straw under pressure with the same quantity of boiling water, removing the concentrated liquid thus obtained, acidulating the same and allowing it to rest whereby the extracted substances are transformed into fermentable matter, and neutralizing the same.

3. The process of producing a liquid suitable for the production of alcohol consisting in leaching out separate quantities of straw under pressure successively with two separate quantities of boiling water exhausting thereby the straw, collecting the liquids thus obtained, acidulating the united liquid and allowing it to rest whereby the extracted substances are transformed into fermentable matter.

4. The process of producing a liquid suitable for the production of alcohol consisting in leaching out separate quantities of straw under pressure successively with two separate quantities of boiling water exhausting thereby the straw, collecting the liquids thus obtained, acidulating the united liquid and allowing it to rest whereby the extracted substances are transformed into fermentable matter, and neutralizing the same.

5. The process of producing a liquid suitable for the production of alcohol consisting in methodically extracting separate quantities of straw by leaching out the first quantity under pressure with boiling water, transferring this liquid to the second quantity, supplying fresh water to the first quantity, boiling both under pressure, transferring the liquid of the second quantity to the third and the liquid of the first to the second, boiling them now under pressure, and so forth, collecting the liquids thus obtained, acidulating the united liquid and allowing it to rest whereby the extracted substances are transformed into fermentable matter, and neutralizing the same.

Signed at New York, N. Y., this 18th day of January, 1908.

WILLIAM F. GILES.

Witnesses:
  LUDWIG K BÖHM,
  CHAS. S. WITHINGTON.